Patented Nov. 7, 1933

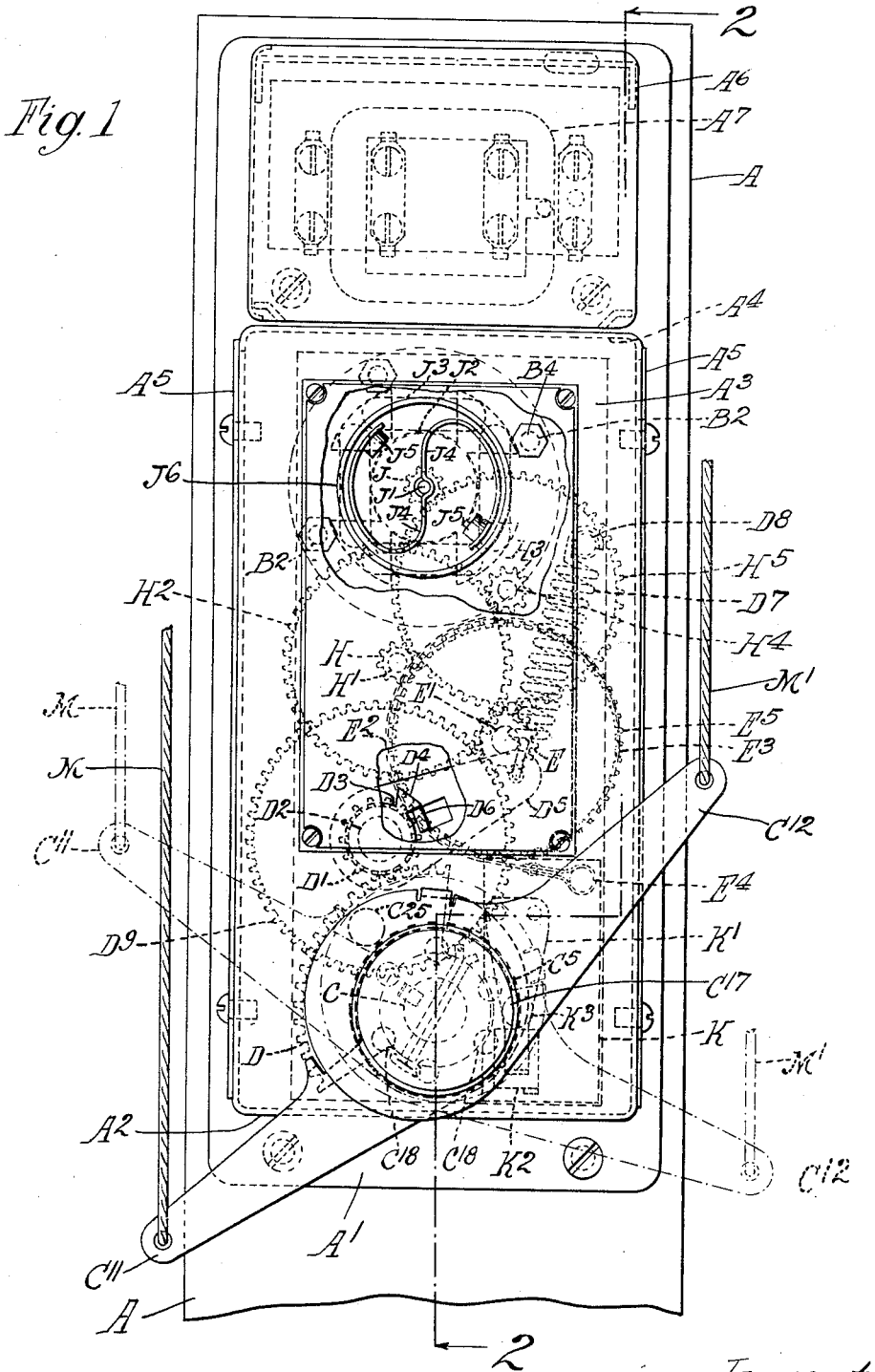

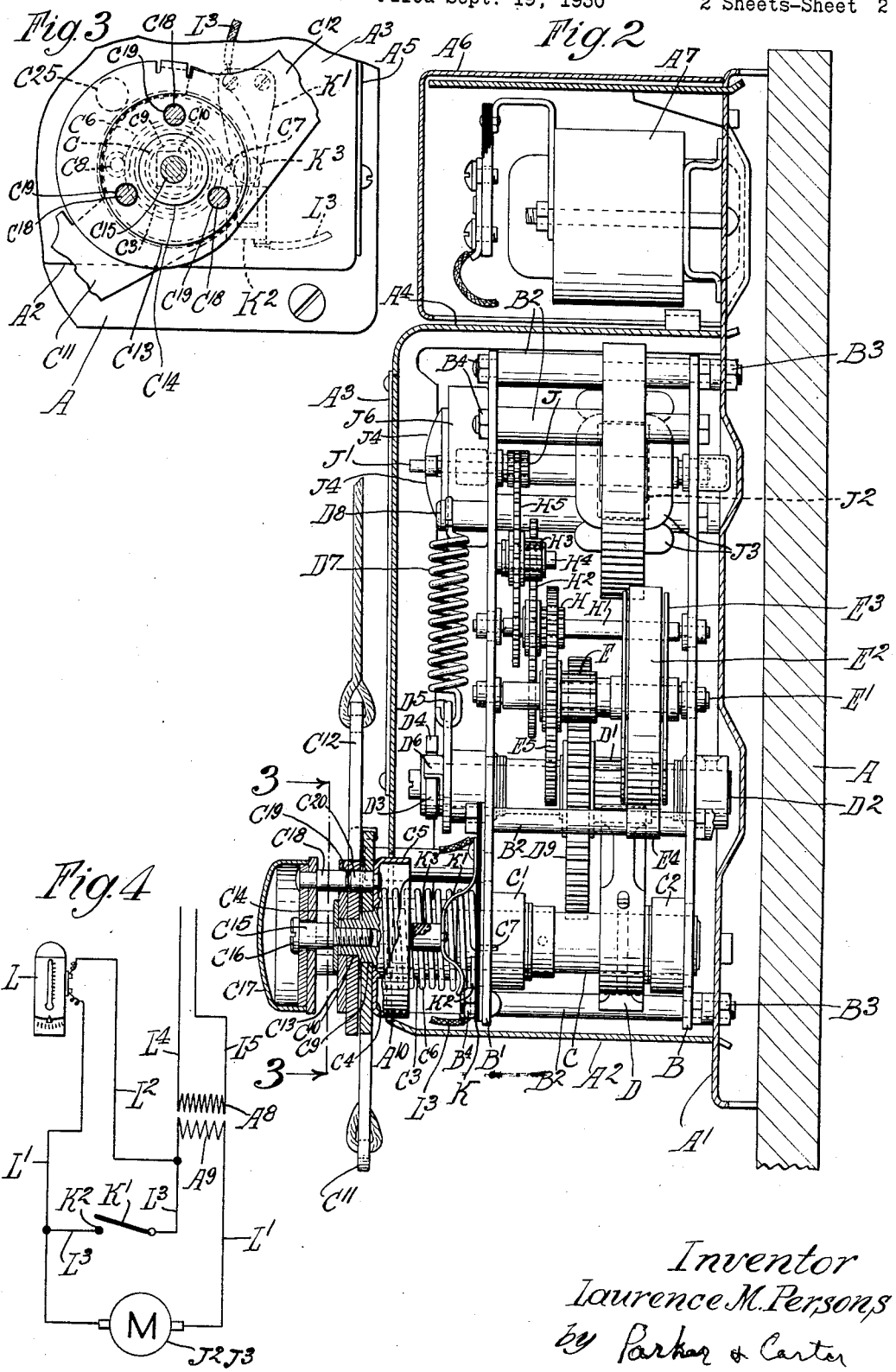

1,933,929

UNITED STATES PATENT OFFICE 1,933,929

DRAFT AND DAMPER CONTROL

Laurence M. Persons, St. Louis, Mo., assignor to Emerson Electric Manufacturing Co., St. Louis, Mo., a corporation of Missouri Application September 19, 1930
Serial No. 482,975

10 Claims. (Cl. 236—16)

My invention relates to actuating means for a draft control, and has for one object to provide draft control means which shall be thermostatically responsive, normally, to room temperature, but which may be interrupted temporarily to permit an operator to stoke the furnace, without permanently interrupting the normal thermostat control. One object is the provision of control means which may be motor actuated in one direction and spring actuated in the other. Other objects will appear from time to time in the course of the specification and claims.

I illustrate my invention more or less diagrammatically in the accompanying drawings, wherein Figure 1 is a front elevation;

Figure 2 is a section on the line 2—2 of Figure 1;

Figure 3 is a section on the line 3—3 of Figure 2; and

Figure 4 is a wiring diagram.

Like parts are indicated by like symbols throughout the specification and drawings.

Referring to the drawings, A generally indicates a supporting surface panel or the like upon which the device herein described may be mounted. $A^1$ generally indicates a base structure, herein shown as of sheet metal. Mounted upon the base $A^1$ is a housing member which may include the bottom $A^2$, the front $A^3$, the top $A^4$ and removable sides $A^5$. $A^6$ generally indicates a supplemental housing, also mounted on the member $A^1$, in which is positioned any suitable transformer $A^7$, the details of which form no part in themselves of the present invention. It may include the primary coil $A^8$ and the secondary $A^9$, as shown in the wiring diagram of Figure 4.

Positioned upon the base $A^1$, and within the housing structure $A^2 A^3 A^4$, is the control assembly which includes the plates B $B^1$ which may be connected to each other as by the spacers $B^2$, the inner ends of which may be secured as by the nuts $B^3$ to the base $A^1$, the outer ends having secured thereto the nuts $B^4$, whereby the assembly is locked together and positioned upon the base $A^1$.

Rotatably mounted, for example in the bearings $C^1 C^2$, is the shaft C which extends outwardly through an aperture $A^{10}$ in the housing member $A^3$, the aperture being of sufficient size to permit the passage therethrough of the shaft and the below described parts associated with it. Rotatably mounted upon the shaft C is a sleeve $C^3$, one end of which is expanded as at $C^4$ and provided with a recurved cylindrical flange $C^5$. Interposed with the enlargement $C^4$ and the plate $B^1$ is the coil spring $C^6$, one end of which is locked as at $C^7$ in the plate $B^1$, the other to the pin $C^8$ on the enlargement $C^4$, as shown in Figure 3. Exteriorly of the sleeve $C^3$ the shaft C is reduced in diameter as at $C^9$ and further reduced as at $C^{10}$, preferably square in cross-section. Upon these two reduced portions are positioned the levers $C^{11}$ and $C^{12}$ respectively. The lever $C^{11}$ is rotatably mounted upon the shaft, and the lever $C^{12}$ is fixed against rotation in relation to the shaft. $C^{13}$ is a washer or spacer fixed in relation to the lever $C^{12}$, and $C^{14}$ is an exterior washer at the end of the shaft which holds the assembly in position, being confined by the shoulder of the screw $C^{15}$. Slidably mounted on the screw $C^{15}$, its outward travel being limited by the head $C^{16}$, is a cup shaped member generally indicated as $C^{17}$, mounted upon which are the plurality of pins $C^{18}$, the function of which will later appear. The hub portion of the lever $C^{12}$, and the connected spacer $C^{13}$ are both apertures as at $C^{19}$ in line with the pins $C^{18}$. Mounted on the expansion $C^4$ are three pins $C^{20}$ which may penetrate the apertures $C^{19}$. When they do, they lock the levers $C^{11}$ and $C^{12}$ against relative rotation. The spring $C^6$ normally thrusts the sleeve $C^3$ and its enlargement $C^4$ in such direction as to keep the pins $C^{20}$ in locking position. The spring has the further function of imparting to the lever $C^{11}$ when released a clockwise movement, referring to the parts in the position in which they are shown in Figure 1. An inward thrust upon the cup or push button $C^{17}$ causes the pins $C^{18}$ to thrust against the pins $C^{20}$ and to push them far enough to release the lever $C^{11}$, and to permit the spring $C^6$ to rotate it to the dotted line position in which it is shown in Figure 1.

Positioned on the shaft C is a gear segment D in mesh with a pinion $D^1$ mounted on a shaft $D^2$ which is supported in any suitable bearings. On the end of the shaft $D^2$, which extends exteriorly of the plate $B^1$, is a generally circular member $D^3$, having a lug or offset $D^4$ extending outwardly from its periphery. Mounted loosely on the shaft $D^2$ is an arm $D^5$ which has an off-set $D^6$ adapted to be opposed to the off-set $D^4$. $D^7$ is a rather powerful coil spring, one end of which is secured to the outer end of the arm $D^5$, the other being anchored as at $D^8$ upon the plate $B^1$.

Held against rotation in relation to the shaft $D^2$ is the gear $D^9$ in mesh with a pinion E on the shaft $E^1$. Mounted upon the shaft $E^1$ is the spiral spring $E^2$, mounted upon the drum $E^3$ and anchored at its inner end upon the shaft $E^1$ and at its outer end as at $E^4$ upon one of the spacers $B^2$ between the plates B and $B^1$.

Held against rotation in relation to the shaft $E^1$ is a gear $E^5$ in mesh with a pinion H upon the shaft $H^1$. The shaft $H^1$ further carries the gear $H^2$ in mesh with a pinion $H^3$ upon the shaft $H^4$.

The shaft $H^4$ carries a gear $H^5$ in mesh with the pinion J upon the shaft $J^1$. The shaft $J^1$ serves as the motor shaft of a static torque motor, the armature of which is indicated as at $J^2$, the field being indicated as at $J^3$. Further mounted on the shaft $J^1$ is a centrifugal governor structure including the springs $J^4$ with the weights $J^5$ and the break drum or track $J^6$. It will be understood that a rotation of the motor shaft above a predetermined speed brings the ends of the spring $J^4$ in contact with the break drum or track, thus preventing further acceleration. It will be understood that the field $J^3$ of the static torque motor is mounted upon and held against rotation by some of the bolts or spacers $B^2$.

Mounted adjacent the shaft C upon the plate $B^1$ is an insulating block K upon which is mounted a spring leaf $K^1$ at the end of which is a contact plate $K^2$. The spring leaf $K^1$ is normally out of contact with the plate $K^2$, but a member $K^3$ is provided, intermediate the ends of the spring leaf of insulating material, which is opposed to the rim of the flange $C^5$. It will be understood that when the cup or button $C^{17}$ is thrust toward the right, referring to the position of the parts as shown in Figure 2, that it engages the insulating block $K^3$ and flexes the spring $K^1$ and thus closes the switch.

Referring to the wiring diagram of Figure 4, L diagrammatically indicates any suitable thermostat, preferably responsive to room temperature. It is in a circuit including the conductor $L^1$ which extends through the static torque motor $J^2$ $J^3$ to one end of the secondary coil $A^9$ of the transformer. $L^2$ indicates a return connection from the opposite end of the coil $A^9$ to the thermostat L. Shunted across the circuit so formed is a conductor $L^3$ in which is the above described switch $K^1$ with its opposed contact plate $K^2$. $L^4$ $L^5$ are conductive lines adapted to actuate the primary coil $A^8$ of the transformer.

I have illustrated my device in the form in which it may be applied to control the drafts of a furnace, although I do not wish to limit myself to such specific use or application. I have illustrated, however, flexible connections M $M^1$ extending from the levers $C^{11}$ and $C^{12}$ respectively. The connection M may extend to the check of a furnace and the connection $M^1$ to the draft. The furnace structure is not shown herein since it does not of itself form part of the present invention.

It will be realized that whereas I have described and shown a practical and operative device, that nevertheless I may make many changes in size, shape, number and disposition of parts without departing from the spirit of my present invention. I wish my drawings, therefore, and my description to be taken as in a broad sense illustrative or diagrammatic, rather than as limiting me to the specific structure herein shown, or to a specific application to furnace draft control.

The use and operation of my invention are as follows:

I illustrate a control device particularly adapted to impart intermittent motion to a plurality of control elements and particularly adapted for use in a draft control regulator for a furnace, wherein automatic thermostat control need at times be interrupted. Referring to the front view, the arm $C^{12}$ is shown in draft closing position, and the lever $C^{11}$ is shown in full line in check opening position. The room thermostat L actuates the motor $J^2$ $J^3$. Upon a predetermined drop in temperature, the thermostat will close the motor circuit and cause the armature $J^2$ to rotate and thereby rotate the entire assembly through the chain of gears above described. Such rotation will continue until the position of the two arms is reversed, and until the arm $C^{11}$ is in the dotted line position against the stop $C^{25}$. At the same time the lever $C^{12}$ will descend to dotted line position. The stop $C^{25}$ will prevent any further rotation and will stall the motor. However, during the brief rotation one effect of the driving of the chain of gears is to wind up the spring $E^2$, during the process of opening the draft and closing the check. This spring is positioned intermediate the ends of the gear train which limits the eating up of power by a frictional loss in gear transmission. In the normal operation of the device when the temperature again rises, the motor circuit is cut off and the spring $E^2$ is then able to impart a retrograde rotation to the motor armature. During the time the motor is stalled against the stop it resists movement of the spring even though the armature is not able to rotate, owing to the interference of the stop.

Assume that the operator wishes to stoke the furnace when the parts are in the position shown in the drawings, the check being opened and the draft closed. The pressure on the button $C^{17}$ will thrust the pins $C^{18}$ through the apertures $C^{19}$ and against the pins $C^{20}$, permitting the spring $C^6$ to rotate the lever $C^{11}$ into the dotted line position of Figure 1, closing the check. When the clutch is thus actuated the motor actuating circuit is closed, independent of the position of the room thermostat, by the closure of the spring $K^1$ $K^2$, through the engagement of the flange $C^5$ with the insulating block $K^3$ on the switch leaf spring $K^1$. The motor then operates to rotate the draft arm into open position. When it reaches open position it snaps into engagement with the clutch so that the two arms are again operable as a unit. This opens the motor circuit, in the event that the thermostat circuit is open, and the device returns to the draft closed, check opened position, retrograde movement being imparted by means of the clock spring $E^2$. The control levers $C^{11}$ $C^{12}$ are normally held in this position, the motor, if actuated by means of the room thermostat L, running until the lever $C^{11}$ engages the stop pin $C^{25}$, the buffer formed by the opposed abutments $D^4$ $D^6$, the spring $D^7$ acting as a buffer spring. When the room thermostat breaks the motor circuit in response to a rise in temperature, the motor then no longer opposes the action of the clock spring $E^2$ and the spring has retained sufficient power to rotate the gear train until it stalls against the buffer above described, and returning the draft arm to closed position and the check arm to open position. The governor, which includes the springs $J^4$ and the drum $J^6$, has for a function to prevent the motor from racing when it is moved in response to the thrust of the spring $E^2$.

The motor may have a normal synchronous speed as high as 1800 R. P. M., but it may be held down to, say 700 R. P. M. by the governor, because of the time element required in the operation of the above described clutch and control mechanism. The full movement may, for example, be about 4½ minutes. Assume that the parts are in the position shown in the drawings and the operator actuates the button or clutch mechanism to permit the check lever to rise, it may take, say 2½ minutes for the motor to return the draft arm to open position. It will then engage with the check arm and the entire assembly will begin to rotate in the opposite direction. One-half to three-quarters of a minute of the return time may be necessary to take up the slack of the flexible check control connection M. The rotation is then completed with the check fully opened and the draft closed. This time is ample to permit the operator to open the door of the furnace and supply a charge of fuel and close the door and go on his way, it being necessary for him to pay no attentiton whatsoever to the controls, except for his initial clutch operating pressure against the button $C^{17}$.

I claim:

1. In combination, work performing members and control means, said control means including a motor, a rotor for said motor, a gear train adapted to be driven by said rotor, controlled means associated with the gear train and work performing members and adapted to be rotated by said gear train and additional rotary motor means adapted to drive said gear train in a direction of rotation opposite to that imparted to it by said first mentioned motor.

2. In combination, work performing members and control means, said control means including a static torque motor and an actuating circuit therefor, a rotor for said motor, controlled means associated with said work performing members and a driving connection between said means and the rotor, and additional rotary motor means adapted, when the actuating circuit of the motor is broken, to impart a retrograde movement to said driving connection, and stop means adapted to limit the movement of said controlled means in response to actuation of the static torque motor.

3. In combination, work performing members and control means, said control means including a static torque motor and an actuating circuit therefor, a rotor for said motor, controlling arms and a driving connection between said arms and the rotor, and additional motor means adapted, when the actuating circuit of the motor is broken, to impart a retrograde movement to said driving connection, and resilient means for stalling said motor after a predetermined movement of the control means.

4. In combination, work performing members and control means, said control means including a static torque motor and an actuating circuit therefor, controlling arms and a driving connection between said arms and the motor, and additional motor means adapted, when the actuating circuit of the motor is broken, to impart a retrograde movement to said driving connection, and means for stalling said motor after a predetermined movement of the control means, including a spring adapted to resist further movement of said driving connection.

5. In combination, work performing members and control means, including a motor, controlling arms and a gear train intermediate said motor and arms, and additional motor means, positioned intermediate the ends of said gear train, adapted to impart a retrograde movement to said gear train.

6. In combination, work performing members and control means including a static torque motor and an actuating circuit therefor, operating members and a driving connection between said members and the rotor of the motor, resilient means for stalling the motor when said members reach a predetermined position, and means for imparting retrograde movement to the control members upon the breaking of said circuit.

7. A control mechanism adapted for thermostatic actuation, which includes one or more work performing members, a static torque motor and an actuating circuit therefor, thermostatic control means in said circuit, additional means for making and breaking said circuit independently of the actuation of the thermostatic means including a clutch and manual means for operating it, an operating member or members for said work performing member or members, and a driving connection between such work performing member or members and the rotor of the motor, resilient means for stalling the motor when said member or members reach a predetermined position, and means for imparting retrograde movement to the operating members upon the breaking of said motor circuit.

8. A control mechanism adapted for thermostatic actuation which includes one or more work performing members, a static torque motor and an actuating circuit therefor, thermostatic control means in said circuit, additional means for making and breaking said circuit independently of the actuation of the thermostatic means including a clutch and manual means for operating it, an operating member or members for said work performing member or members, and a driving connection between such work performing member or members and the rotor of the motor, resilient means for stalling the motor when said member or members reach a predetermined position, and means for imparting retrograde movement to the operating members upon the breaking of said motor circuit, including a spring motor opposed to said electric motor.

9. In combination, work performing members and control means, said control means including a motor, a rotor for said motor, a gear train adapted to be driven by said rotor, controlled means associated with the gear train and work performing members adapted to be rotated by said gear train, and additional rotary motor means adapted to drive said gear train in a direction of rotation opposite to that imparted to it by said first mentioned motor, including a spring adapted to be wound up in response to actuation of the first mentioned rotor.

10. In combination, work performing members and control means, said control means including a static torque motor and an actuating circuit therefor, a rotor for said motor, controlled means associated with said work performing members and a driving connection between said means and the rotor, and additional rotary motor means adapted when the actuating circuit of the motor is broken, to impart a retrograde movement to said driving connection, and resilient stop means adapted to limit the movement of said controlled arms in response to actuation of the static torque motor.

LAURENCE M. PERSONS.